US010725687B1

(12) United States Patent
Sela et al.

(10) Patent No.: US 10,725,687 B1
(45) Date of Patent: Jul. 28, 2020

(54) SETTABLE REPLAY PROTECTED MEMORY BLOCK CHARACTERISTICS IN A LOGIC UNIT

(71) Applicant: Western Digital Technologies, Inc., San Jose, CA (US)

(72) Inventors: Rotem Sela, San Jose, CA (US); David Brief, San Jose, CA (US); Eliad Adi Klein, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 23 days.

(21) Appl. No.: 16/357,774

(22) Filed: Mar. 19, 2019

(51) Int. Cl.
*G06F 12/00* (2006.01)
*G06F 3/06* (2006.01)
*G06F 12/02* (2006.01)
*G06F 12/14* (2006.01)

(52) U.S. Cl.
CPC ............ *G06F 3/0644* (2013.01); *G06F 3/064* (2013.01); *G06F 3/0659* (2013.01); *G06F 3/0679* (2013.01); *G06F 12/0238* (2013.01); *G06F 12/14* (2013.01)

(58) Field of Classification Search
None
See application file for complete search history.

(56) References Cited

U.S. PATENT DOCUMENTS

| 2015/0220458 | A1* | 8/2015 | Bhooma | G06F 9/30043 |
| | | | | 711/163 |
| 2016/0371496 | A1* | 12/2016 | Sell | G06F 12/14 |
| 2018/0075236 | A1* | 3/2018 | Kwon | G06F 3/0634 |
| 2020/0014544 | A1* | 1/2020 | Sela | H04L 9/0894 |

* cited by examiner

*Primary Examiner* — Daniel D Tsui
(74) *Attorney, Agent, or Firm* — Dickinson Wright PLLC; Steven Hurles

(57) ABSTRACT

A method for data protection in a memory system includes receiving, from entity, an address range and a set command, the address range corresponding to at least a portion of a memory partition in the memory system. The method further includes determining whether the entity is an authenticated entity. The method further includes based on the determination of whether the entity is an authenticated entity, setting, using the set command, access characteristics of the portion of the partition corresponding to the address range.

20 Claims, 8 Drawing Sheets

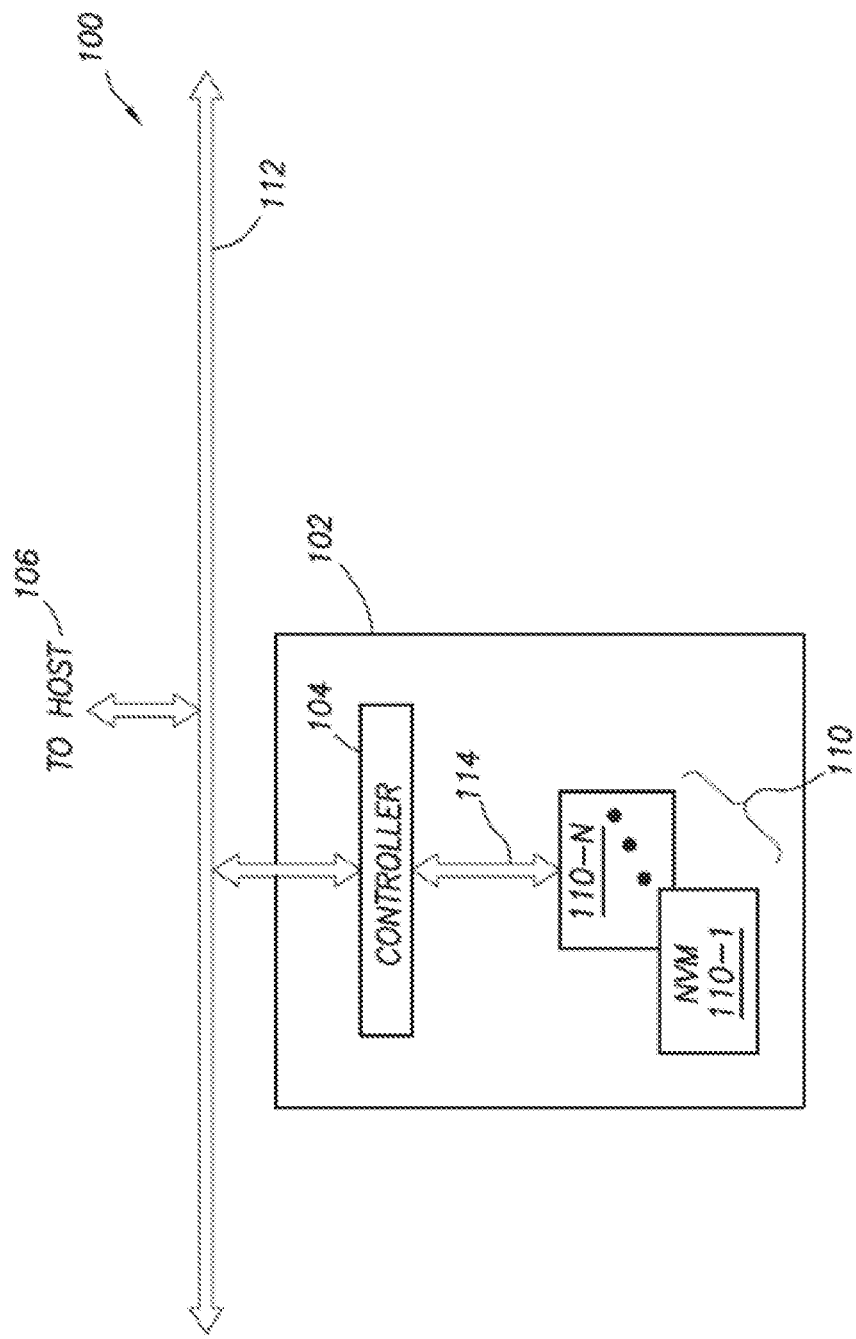

| State Number | Standard Read | Standard Write | RPMB Read | RPMB Write |
|---|---|---|---|---|
| 1 | Open Access | Open Access | Closed Access | Closed Access |
| 2 | Open Access | Closed Access | Closed Access | Closed Access |
| 3 | Closed Access | Closed Access | Authenticated Access | Authenticated Access |
| 4 | Open Access | Closed Access | Authenticated Access | Authenticated Access |

FIG. 4A

SETTABLE REPLAY PROTECTED MEMORY BLOCK CHARACTERISTICS IN A LOGIC UNIT

TECHNICAL FIELD

This disclosure relates to memory systems, and in particular to methods and systems for dynamically setting replay protected memory block characteristics in logic units of memory systems.

BACKGROUND

Non-volatile memory systems are a type of memory that retains stored information without requiring an external power source. Non-volatile memory is widely used in various electronic devices and in stand-alone memory devices. For example, non-volatile memory can be found in laptops, digital audio player, digital cameras, smart phones, video games, scientific instruments, industrial robots, medical electronics, solid state drives, USB drives, memory cards, and the like. Non-volatile memory can be electronically written (e.g., programmed/reprogrammed), erased, and read.

Typically, various portions of memory partitions of the memory system may have different read and/or write protection characteristics set, which allow various entities (e.g., a host, such as a System on a Chip (SoC), a controller, a remote server, or other suitable entity) to read from and write to the memory partitions. For example, a first portion of a memory partition may have an open access read, which may allow any entity to read from the first portion of the memory partition, and a closed access write, which may prevent any entity from writing to the first portion of the memory partition. In addition, portions of the memory partitions may include a replay protected memory block partition, which may have an authenticated access write, which may only allow authorized entities to write to the replay protected memory block partition.

SUMMARY

This disclosure relates generally to memory management systems and methods.

An aspect of the disclosed embodiments is a method for data protection in a memory system. The method includes receiving, from an entity, an address range and a set command that defines security characteristics of the address range, the address range corresponding to at least a portion of a memory partition in the memory system. The method further includes determining whether the entity is an authenticated entity. The method further includes based on the determination of whether the entity is an authenticated entity, setting, using the set command, at least a replay protected memory block (RPMB) read characteristic of the portion of the partition corresponding to the address range and an RPMB write characteristic of the portion of the partition corresponding to the address range.

Another aspect of the disclosed embodiments is a memory system that includes a non-volatile storage having memory partitions and a controller in communication with the memory partitions. The controller is configured to receive, from an entity, an address range and a set command, the address range corresponding to at least a portion of a memory partition in the memory system. The controller is further configured to determine whether the entity is an authenticated entity. The controller is further configured to, based on the determination of whether the entity is an authenticated entity, set, using the set command, at least: a replay protected memory block (RPMB) read characteristic of the portion of the partition corresponding to the address range; and an RPMB write characteristic of the portion of the partition corresponding to the address range.

Another aspect of the disclosed embodiments is a method for operating a memory system having a controller and memory partitions. The method includes receiving, from an entity, an address range and a set command, wherein the address range corresponds to at least a portion of a memory partition in the memory system and wherein the set command includes a command to set the portion of the partition corresponding to the address range to a protected state of a plurality of dynamically selectable protected states. The method further includes determining whether the entity is an authenticated entity. The method further includes based on the determination of whether the entity is an authenticated entity, setting, using the set command, at least: a replay protected memory block (RPMB) read characteristic of the portion of the partition corresponding to the address range; and an RPMB write characteristic of the portion of the partition corresponding to the address range.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIGS. 1A-1B generally illustrates a block diagram of an example non-volatile memory system according to the principles of the present disclosure.

FIGS. 4A and 4B generally illustrate protected state diagrams according to the principles of the present disclosure.

DETAILED DESCRIPTION

Figure 1B:
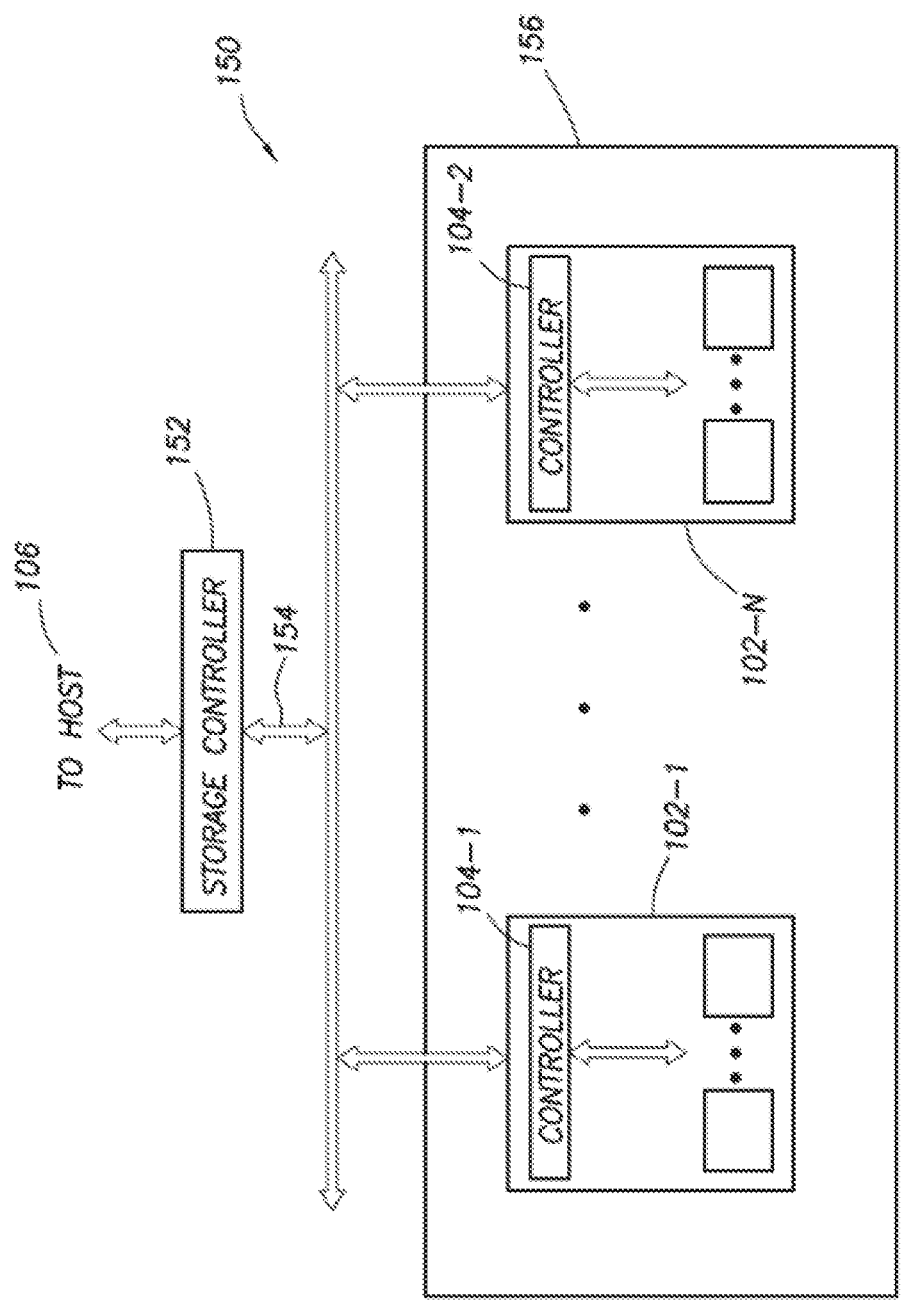

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, non-volatile memory systems provide a type of computer memory that retains stored information without requiring an external power source. One type of non-volatile memory, flash memory, is widely used in various computing devices and in stand-alone memory devices. For example, flash memory can be found in laptops, digital audio player, digital cameras, smart phones, video games, scientific instruments, industrial robots, medical electronics, solid state drives, USB drives, memory cards, and the like. Flash memory, as well as other types of non-volatile memory, can be electronically written (e.g., programmed/reprogrammed), erased, and read.

Various portions of memory partitions of the memory system may have different read and/or write protection characteristics set, which allow various entities, such as a host (e.g., a System on a Chip (SoC), a controller, a remote server, or other suitable host) to read from and write to the memory partitions. For example, a first portion of a memory partition may have an open access read, which may allow any entity to read from the first portion of the memory partition, and a closed access write, which may prevent any entity from writing to the first portion of the memory partition. In addition, portions of the memory partitions may include a replay protected memory block (RPMB) partition, which may have an authenticated access write, which may only allow authorized entities to write to the RPMB partition.

Typically, an RPMB partition is a partition used in various non-volatile memory systems such as, embedded multimedia controller (eMMC) systems, universal flash storage (UFS) systems, non-volatile memory express (NVMe) systems, or other suitable memory systems. An RPMB partition allows an entity to read from and/or write to the RPMB partition in a secure manner. For example, the read access and write access of an RPMB partition are replay protected such that, only an authorized entity can write to the RPMB partition. Authentication of the entity is controlled using an encryption scheme, such as a hash message authentication code (HMAC) scheme. For example, authentication of the entity may be controlled using a symmetric key scheme. A controller associated with the RPMB partition determines whether a key residing on the entity attempting to read from and/or write to the RPMB partition corresponds to a key residing on the memory system (e.g., associated with the RPMB partition).

In systems that include an RPMB partition, the RPMB partition will continue to be defined as an RPMB partition (e.g., it cannot be reset to a standard partition or other type of partition). Further, all partitions not defined as an RPMB partition cannot be defined as such and can only be accessed using standard read and write operations (e.g., open access or closed access). Typically, in order to prevent unauthorized write operations on a standard partition, memory systems include a write protection mechanism, such as a software write protection, a permanent write protection, a power-on write protection, a secure write protection, or other suitable write protection. However, write protection mechanisms may be disabled during operation of the memory system and any entity may be able to write to the standard partition. Thus, using a write protection mechanism, a standard partition is limited to an open access or closed access state.

In addition to the above, an RPMB partition is size restricted. For example, in an RPMB partition in a UFS system, the RPMB partition is limited to 16 megabytes. Further, only one partition can be defined as an RPMB partition in any memory system and standard read, write, and erase operations are not valid on an RPMB partition since it may violate its security scheme.

Accordingly, systems and methods, such as those disclosed herein, that allow for dynamic setting of the standard read, standard write, RPMB read, and/or RPMB write characteristics of a partition, may be desirable. The systems and methods disclosed herein allow an authenticated host to dynamically set an address range (or an entire partition) in one of the four states, as will be described. For example, when an original equipment manufacturer (OEM) accesses a partition of the memory system to load an operating system (OS) in a secure environment (e.g., such as a pre-production environment or a manufacturer controlled environment), the partition may be configured in a state (e.g., state 1 as will be described) to allow standard write operations on the partitions. When the memory system is leaving the production environment (e.g., before the memory system is sent to a customer environment), the partition may be reconfigured to a different state by an authorized entity (e.g., state 4, as will be described), such that the data associated with the OS loaded to the partition is protected from unauthorized entities making changes to the partition, while data associated with the OS loaded to the partition can still be read by any entity. Further, only authorized entities (e.g., entities holding the appropriate symmetric key) can write to the partition while in the different state.

Such systems and methods may provide for a partition having security features of RPMB partitions, while not restricting the size of the partition to the size restrictions of an RPMB partition. Further, such systems and methods may provide for versatile protection states of the partition (e.g., by enabling an authenticated entity to update the partition and not limit the partition to an open access, closes access, or write protected state) and may provide for high read performance of the partition (e.g., by allowing standard read with high protection from a partition protected by an RPMB write flow). Additionally, or alternatively, such systems and methods may provide for high write performance of the partition (e.g., by allowing standard write to the partition when the memory system is in the secure environment). The specification now turns to an example computer architecture that utilizes memory, in accordance with example embodiments.

FIG. 1A illustrates a block diagram of an example system architecture 100 including non-volatile memory. In particular, the example system architecture 100 includes storage system 102 (e.g., which may be referred to as a memory system), a controller 104, and a host 106. In various embodiments, the host 106 can include any device or system that utilizes the storage system 102. In some embodiments, various aspects of the controller 104 may be implemented by the host 106 or the host 106 can include its own controller (e.g., a processor) configured to execute instructions stored in the storage system 102 and further the host 106 can access data stored in the storage system 102.

Examples of the host 106 include computing devices such as a desktop computer, rack mounted server, a laptop, a smartphone, a tablet, or other suitable computing devices. Host 106 can also include systems and devices such as a gaming system, a digital phone, a digital camera (e.g., digital still cameras and digital movie cameras), portable media player, digital photo frame, remote control, television stick, smart television, and the like. Furthermore, the system architecture 100 can be implemented in a memory card such as secure digital (SD) card or a micro secure digital (micro-SD) card. In some embodiments, the system architecture 100 is embedded in the host, for example as a solid state disk (SSD) drive installed in a laptop computer.

In embodiments where the system architecture 100 is implemented within a memory card, the host 106 can include a built-in receptacle for one or more types of memory cards or flash drives (e.g., a universal serial bus (USB) port, or a memory card slot). Additionally, or alternatively, the host 106 can include adapters into which a memory card may be plugged. The foregoing examples of a host are not meant to be limiting examples. On the contrary, a host 106 can include any type of device, system, and apparatus that accesses the storage system 102.

In FIG. 1A, the storage system 102 includes a memory controller and drivers (e.g., controller 104)—as will be described further below—however, in some embodiments of the storage system 102, the storage system 102 may include memory-only units that are instead controlled by software executed by a controller on the host 106 (e.g., a processor of a computing device controls, including error handling of, the storage system 102). Furthermore, although FIG. 1A illustrates the storage system 102 as separate from the host 106, in some embodiments, the storage system 102 is embedded with the host 106, where the memory, controller, and drivers are formed on a single integrated circuit chip.

The host 106 can communicate with the storage system 102 using a bus 112 that implements any known or after developed communication protocol that enables the storage system 102 and the host 106 to communicate. The communication protocol may include e.MMC protocol, UFS protocol, NVMe protocol, Secure Digital (SD) protocol, Memory stick (MS) protocol, USB protocol, Advanced Microcontroller Bus Architecture (AMBA), or other suitable communication protocol.

In various embodiments, the controller 104 acts as an interface between the host 106 and the storage system 102. The host 102 may communicate with the controller 104 via a bus interface associated with the bus 112. The controller 104 can include individual circuit components, processing circuitry (e.g., logic gates and switches), a processor, a microprocessor, a microcontroller with controlling software, or a field programmable gate array (FPGA). Furthermore, the example controller 104 includes a computer-readable medium that stores computer-readable program code (e.g., software or firmware) executable by the processor. In some embodiments, the controller 104 is a flash memory controller. In some embodiments, the controller 104 is a processor executing within the host 106.

Still referring to FIG. 1A, according to some embodiments, the controller 104 acts as an interface between the host 106 and the storage system 102 and manages data stored on the storage system 102. For example, the host 106 can access data stored in the storage system 102 by providing a logical address, via the bus interface associated with the bus 112, to the controller 104, which, the controller 104 converts to a physical address. The controller 104 can access data and/or a particular storage location associated with the physical address and facilitate transferring data between the storage system 102 and the host 106. In some embodiments, where the storage system 102 includes flash memory, the controller 104 formats the flash memory to ensure the memory is operating properly, maps out bad flash memory cells, and allocates spare cells to be substituted for future failed cells or used to hold firmware to operate the flash memory controller (e.g., the controller 104).

Accordingly, the controller 104 performs various memory management functions such as wear leveling (e.g., distributing writes to extend the lifetime of the memory blocks), garbage collection (e.g., moving valid pages of data to a new block and erasing the previously used block), and error detection and correction (e.g., read error handling).

Still referring to FIG. 1A, the storage system 102 includes the non-volatile memory (NVM) block 110 which may include several memory die 110-1—110-N. In some embodiments, the NVM block 110 defines a physical set of memory die, such as the memory die 110-1—110-N. In other embodiments, the NVM block 110 defines a logical set of memory die, where the NVM block 110 includes memory die from several physically different sets of memory die. The manner in which the NVM block 110 is defined in FIG. 1A is not meant to be limiting.

Each memory die, for example memory die 110-1, includes non-volatile memory cells, such as NAND flash memory cells or NOR flash memory cells. As the memory cells are non-volatile, the memory cells in the storage system 102 retain data even when there is an interruption in power supplied to the memory cells and/or the storage system 102. Thus, the storage system 102 can be easily transported and the storage system 102 can be used in memory cards and other memory devices that are not always connected to a power supply.

In various embodiments, the memory cells in the memory die 110 are solid-state memory cells (e.g., flash) and are one-time programmable, few-time programmable, or many time programmable. Additionally, the memory cells in the memory die 110 can include single-level cells (SLC), multi-tiple-level cells (MLC), triple-level cells (TLC), or quad-level cells (QLC). In some embodiments, the memory cells are fabricated in a planar manner (e.g., 2D NAND (NOT-AND) flash) or in a stacked or layered manner (e.g., 3D NAND flash). That is, planar flash memory includes a single layer of memory cell, while stacked flash memory includes memory cells that are stacked vertically in multiple layers.

In some embodiments, and as shown in FIG. 1A, the controller 104 and the NVM block 110 are communicatively coupled by an interface 114 that implements any known or after developed communication protocol. In embodiments where the storage system 102 is flash memory, the interface 114 is a flash interface, such as Toggle Mode 200, 400, or 800, or Common Flash Memory Interface (CFI). In various embodiments, the interface 114 can be implemented by several channels (i.e., physical connections) disposed between the controller 104 and the individual memory die 110-1—110-N. Furthermore, the number of channels over which the interface 114 is established varies based on the capabilities of the controller 104. Additionally, a single channel can be configured to communicatively couple more than one memory die. The depiction of a single interface 114 is not meant to be limiting. To the contrary, the single interface is representative of an example interface that can be used between components, and one or more interfaces can be used to communicatively couple the same components.

FIG. 1B generally illustrates a block diagram of a system architecture according 100 to the principles of the present disclosure. The system architecture 100 can be implemented as part of a larger system architecture. For example, as shown in FIG. 1B, the system architecture 150 includes a storage module 156 that further includes several storage systems 102. Within the example system architecture 150 the storage module 156 is communicatively coupled with the host 106 by way of a storage controller 152. In particular, an interface 154 between the host 106 and the storage module 156 includes a bus interface that implements any known or after developed communication protocol, such as a serial advanced technology attachment (SATA) or peripheral component interface express (PCIe) interface. In some embodiments, the storage module 156 is an SSD (e.g., in a laptop computer or a tablet).

Some implementations of the system architecture 100 include a hierarchical storage system. A hierarchical storage system can include a plurality of storage controllers 152, each of which control a respective storage system 102. Furthermore, a plurality of hosts 106 can each access the hierarchical storage system. Hosts 106 can access memories within the hierarchical storage system via a bus interface that implements any known or after developed communication protocol including a non-volatile memory express (NVMe) or a fiber channel over Ethernet (FCoE) interface. The hierarchical storage system can be implemented as a rack mounted storage system that is accessible by multiple host computers (e.g., a data center).

The interface 154 can be implemented by several channels (i.e., physical connections) disposed between the storage controller 152 and the storage module 156. In some embodiments, the number of channels over which an interface 154 is established varies based on the capabilities of the storage controller 152. The depiction of a single interface is not meant to be limiting and the single interface is representative of an example interface that can be used between components, where one or more interfaces can be used to communicatively couple various components.

Figure 2A:
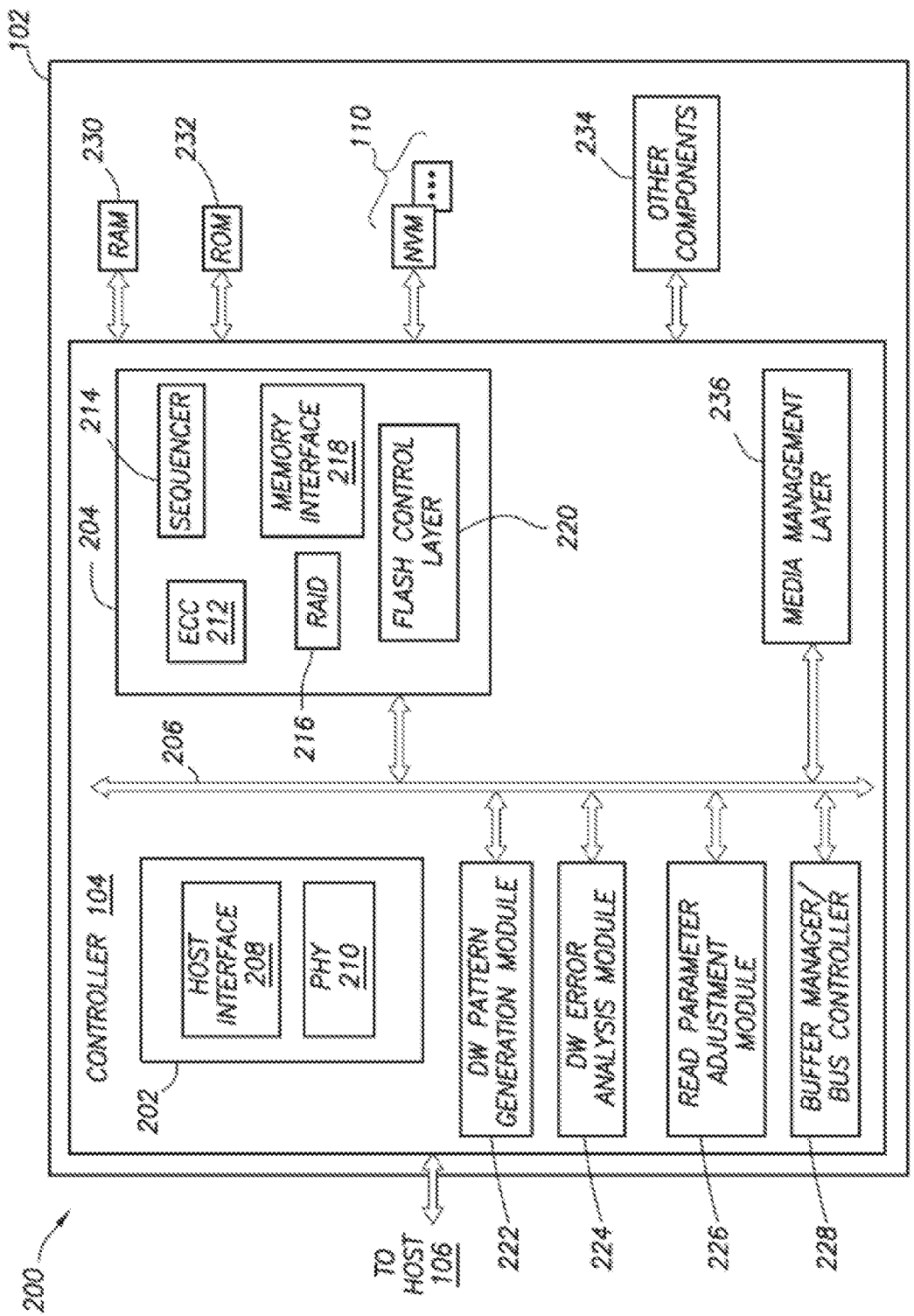
FIG. 2A generally illustrates a block diagram of example components of a controller according to the principles of the present disclosure.

FIG. 2A generally illustrates a block diagram 200 of the storage system 102, according to the principles of the present disclosure. The block diagram 200 of the storage system 102 includes components previously described in FIG. 1A, such as the controller 104 and the NVM memory block 110. Additional components that can be present within the storage system 102 include a random access memory (RAM) 230, a read only memory (ROM) 232, and other components 234. In some embodiments, the ROM 232 stores system boot code.

Although the RAM 230 and the ROM 232 are shown as separate modules within the storage system 102, the illustrated architecture is not meant to be limiting. For example, the RAM 230 and the ROM 232 can be located within the controller 104. In some embodiments, portions of the RAM 230 or ROM 232, respectively, are located outside the controller 104 and within the controller 104. In other embodiments, the controller 104, the RAM 230, and the ROM 232 can be located on separate semiconductor die. In various embodiments, the other components 234 include external electrical interfaces, external RAM, resistors, capacitors, logic gates, or other components that interface with the controller 104.

In some embodiments, the controller 104 includes a module 202 that interfaces with the host 106, a module 204 that interfaces with the NVM memory block 110, as well as various other modules, described further below. The modules within the controller (e.g., modules 202 and 204) are communicatively coupled to each other by a bus 206.

The following discussion of the various modules depicted within the controller 104 are meant to be illustrative and not limiting. For example, the various modules generally illustrated in FIG. 2A are not limited to being executed within the controller 104, and in some embodiments, one or more modules can be executed outside the controller 104.

The module 202 interfaces with the host 106 and includes a host interface 208 and a physical layer interface 210 that provides the electrical interface between the host 106 or next level storage controller and the controller 104. The host interface 208 facilitates transferring of data, control signals, and timing signals. Examples of the host interface 208 include e.MMC, UFS, SD, SATA, SATA express, Serial Attached SCSI (SAS), Fibre Channel, USB, PCIe, and NVMe.

Still referring to FIG. 2A, in various embodiments, the module 204 is configured to communicate with the NVM block 110 and includes an error correcting code (ECC) engine 212. In some embodiments, the ECC engine 212 encodes data received from the host 106 and stores the encoded data in the NVM block 110. When the data is read out from the NVM memory block 110, the ECC engine 212 decodes the data and corrects errors detected within the data. To detect errors, the ECC engine 212 implements various types of error checking using algorithms such as low-density parity-check (LDPC) code, Bose-Chaudhuri-Hocquenghem (BCH) code, a soft read, and/or extra parity.

The example module 204 also includes a sequencer 214 and a Redundant Array of Independent Drives (RAID) module 216. In various embodiments, the sequencer 214 generates command sequences, such as program and erase command sequences that are transmitted to the NVM memory block 110. The RAID module 216 generates RAID parity and recovery of failed data. The RAID parity can be used to provide an additional level of integrity protection for data written into the NVM memory block 110. In some embodiments, the ECC engine 212 implements the functions of the RAID module 216.

The example module 204 also includes a memory interface 218 that provides the command sequences to the NVM memory block 110 and receives status information from the NVM memory block 110. For example, the memory interface 218 implements any known or after developed communication protocol including a double data rate (DDR) interface, such as a Toggle Mode 200, 400, or 800 interface. The module 204 also includes a flash control layer 220 that controls the overall operation of the module 204.

Still referring to example modules within the controller 104 in FIG. 2A, additional modules within the controller 104 includes a dummy word line (DW) pattern generation module 222, a DW error analysis module 224, and a read parameter adjustment module 226. Dummy word lines are placed on non-volatile memory die that are used for the purposes of analyzing and tracking behavior and health of a respective non-volatile memory die. In various embodiments, the DW pattern generation module 222 puts a known data pattern into a dummy word line and tracks or periodically check for errors by reading the data back out of the dummy word line and comparing the data to the known data pattern.

In various embodiments, the read parameter adjustment module 226 adjusts parameters associated with a particular non-volatile memory die. For example—and as discussed further below—the read parameters adjustment module 226 can adjust parameters associated with a particular non-volatile memory die during an operation—i.e., a read or write—to adjust or re-adjust the read parameters. During the operation to re-adjust the read parameters, the read parameter adjustment module 226 adjusts the read parameters for a particular memory block, reads data out of the memory block, and verifies a resulting BER. If the resulting BER falls at or below a target or expected BER, the read parameters adjustment module 226 stores the read parameters for the memory block. Subsequently, the stored read parameters are used during a read of any word line within the memory block. Thus read parameters can be unique to a memory block.

Additional modules within the example controller 104 include a buffer manager/bus controller 228 that manages, for example, buffers in the RAM 230 and controls the internal bus arbitration of the bus 206 in the controller 104. Additionally, or alternatively, the controller 104 can include a media management layer 236 that performs wear leveling of the NVM memory block 110. As previously mentioned, the various modules described with respect to the controller 104 are not meant to be limiting as to the architecture of the controller 104. For example, the physical layer interface 210, the RAID module 216, the media management layer 236, and the buffer management/bus controller 228 can be examples of optional components within the controller 104.

Furthermore, in embodiments where the storage system 102 includes flash memory, the media management layer 236 can be integrated as part of the flash management that handles flash error and interfaces with the host 106. In particular, the media management layer 236 can include an algorithm (e.g., firmware in the memory device), that translates a write command received from the host 106 into a write to the NVM memory block 110.

Figure 2B:
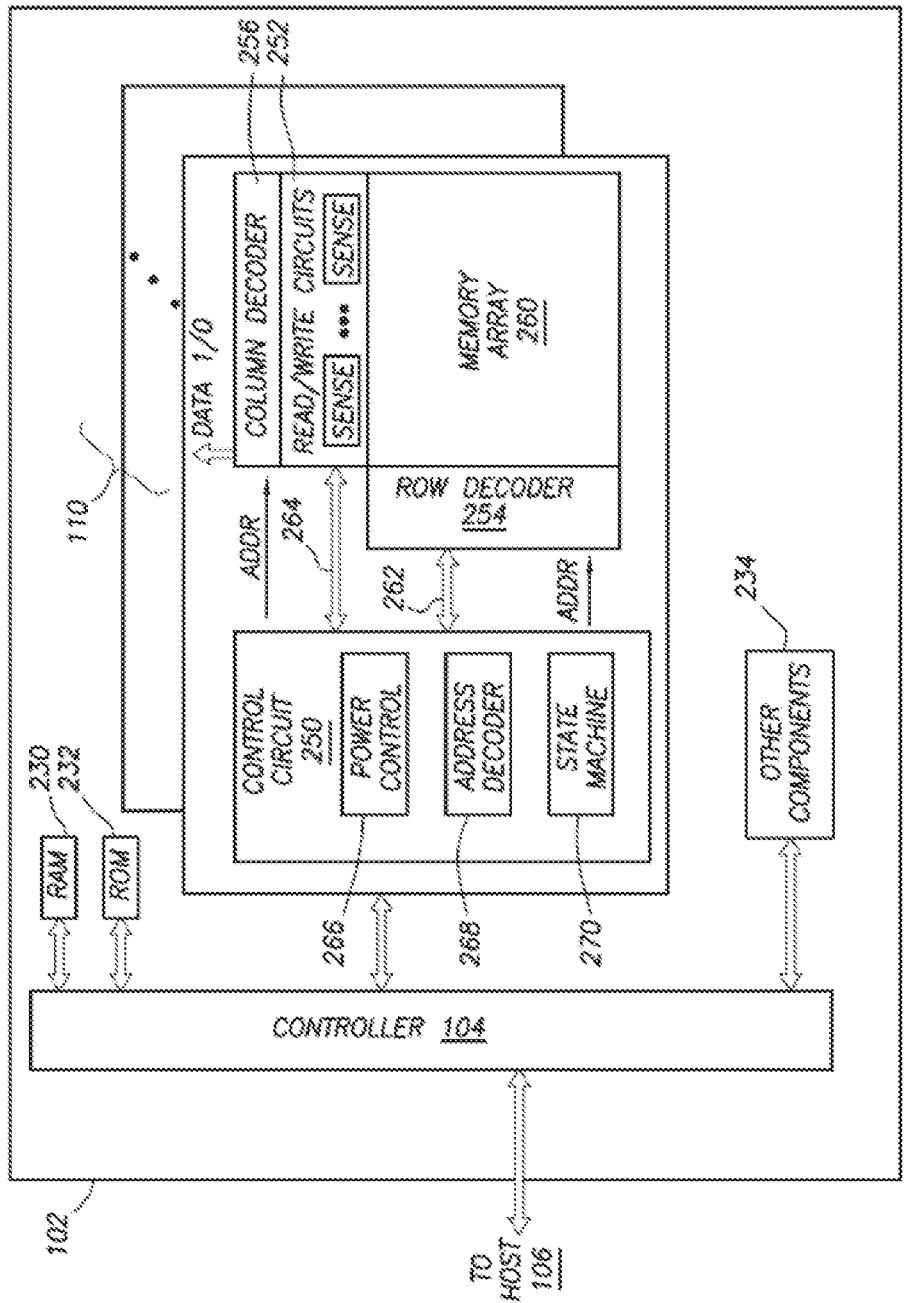
FIG. 2B generally illustrates a block diagram of example components of a non-volatile memory storage system according to the principles of the present disclosure.

FIG. 2B generally illustrates a block diagram with various features of the NVM memory block 110 within the storage system 102. As details of the controller 104 have been previously described (in FIG. 2A), in FIG. 2B the controller 104 is illustrated as a single block. Additionally, previously described RAM 230, the ROM 232, and the other components 234 are included in FIG. 2B to help orient the reader. Next, details within an example memory die 110-1 are discussed. Although the discussion centers on the memory die 110-1, each of the features discussed in relation to the memory die 110-1 equally applies to all the memory die within NVM memory block 110.

In some embodiments, the example memory die 110-1 includes control circuit 250, read/write circuits 252, a row decoder 254, a column decoder 256, and a memory array 260. The memory array 260 can include a two-dimensional array or a three-dimensional array of memory cells. The read/write circuits 252 read and program pages of memory within the memory die 110-1, in parallel. In various embodiments, the memory array 260 is accessed by word lines via the row decoder 254 and by bit lines via the column decoder 256.

The architecture of the memory die 110-1 is not meant to be limiting and any known architecture that can perform the functions of accessing the memory array 260 can be used without departing from the scope of this disclosure. For example, in various embodiments, access to the memory array 260 by various peripheral circuits can be implemented in a symmetric fashion on opposite sides of the memory array 260 which reduces the densities of access lines and circuitry on each side of the memory array 260.

Still referring to FIG. 2B, in various embodiments, the example control circuit 250 includes a power control circuit 266, an address decoder 268, and a state machine 270. In some embodiments, the power control circuit 266, the address decoder 268, and the state machine 270 can be collectively referred to as managing circuits. The control circuit 250 and its various managing circuits, are communicatively coupled by various interfaces (e.g., interfaces 262 and 264) to the row decoder 254 and the column decoder 256. In various embodiments, the control circuit 250 performs various operations on the memory array 260 that include reading or writing to the memory cells.

The power control circuit 266 controls the power and voltage supplied to the word lines and bit lines during operation of the memory array 260. The address decoder 268 provides an address interface that translates addresses between addresses provided by the host 106 and addresses used by the row decoder 254 and the column decoder 256. The example address decoder 268 converts an address provided by the host 106 to an address that is understood and compatible with a format used by the row decoder 254 and the column decoder 256. The state machine 270 provides chip-level control of memory operations.

Thus, the storage system 102 includes various components including the controller 104 and the NVM memory block 110, details of which have been described above in FIGS. 1A, 1B, 2A, and 2B. The discussion now turns to an example architecture of an example memory array 260 and in particular methods that can be performed to improve a performance of a read in the storage system 102.

Figure 3:
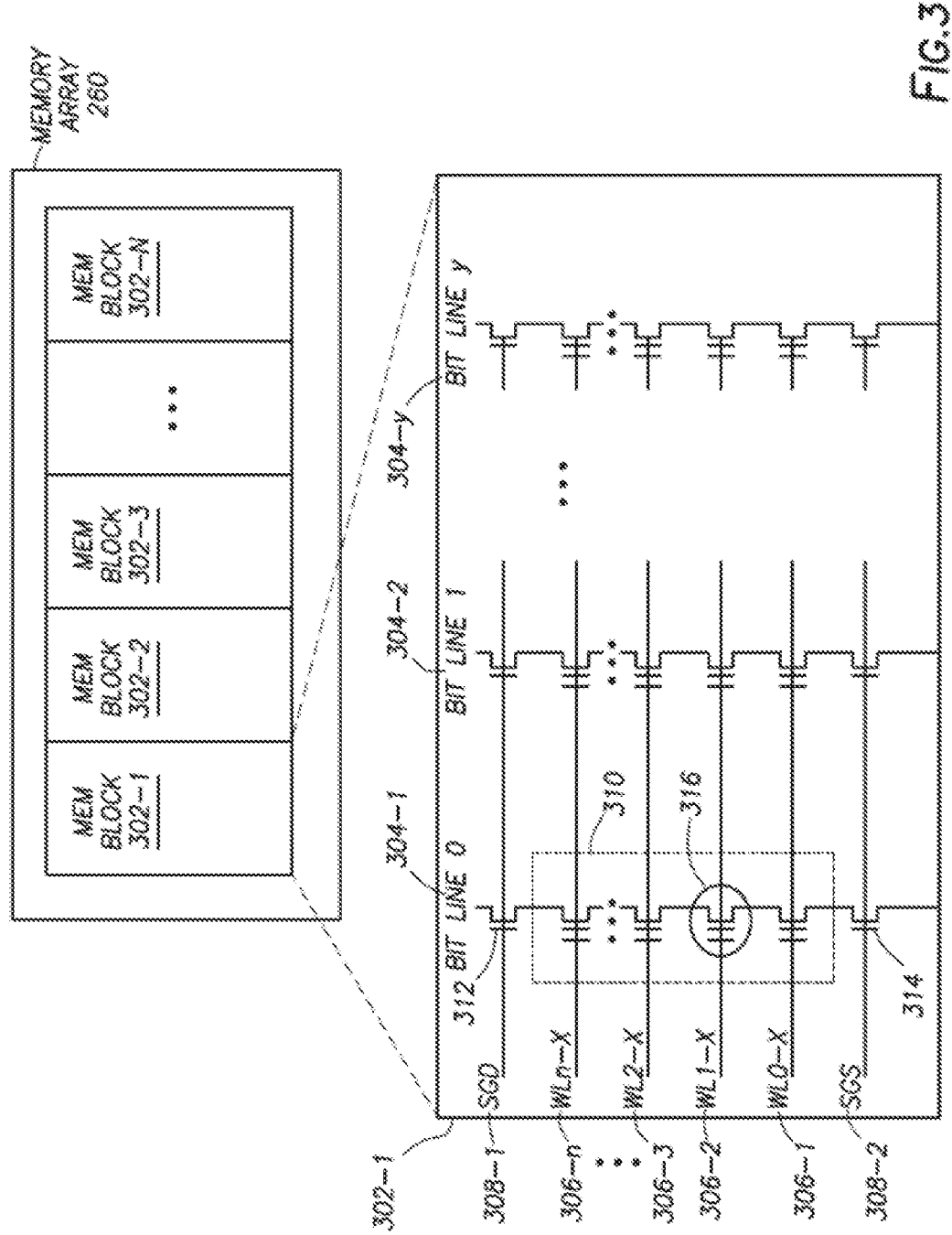
FIG. 3 generally illustrates a memory block according to the principles of the present disclosure.

FIG. 3 further illustrates the memory array 260. The memory array 260 is divided into several memory blocks 302. In flash memory, a memory block is defined as a unit of erase. That is, each memory block 302 includes a number of memory cells that are erased together or as a block. In some embodiments, the memory array 260 can be partitioned into any number of blocks, for example, the memory array 260 includes 1,024 blocks. Additionally, or alternatively, each of the memory blocks 302 can conceptually be divided into a number of pages defined as a unit of programming. In some embodiments, a page of data can be stored in one row of memory cells. Each page can include user data and overhead data, where the overhead data includes CC that has been calculated from the user data.

Each memory block 302, for example memory block 302-1, includes multiple bit lines 304, word lines 306, and select lines 308. Each bit line, for example bit line 304-1, is connected to several memory cells connected in series. More particularly, in an embodiment where each memory cell is a floating gate transistor, the floating gate transistors are connected in series to form a NAND string 310 (e.g., illustrated within the dashed box). Although four memory cells are shown in FIG. 3, the number of memory cells within the NAND string is not meant to be limiting. For example, 16, 32, 64, 128, or any other number of memory cells can be connected in a NAND string. Each respective bit line 304 is coupled to a respective NAND string within the block 302.

Still referring to FIG. 3, a method of reading data stored in a particular memory cell—e.g., memory cell 316—includes applying a voltage to the select lines 308 of the block 302, which in turn are coupled to respective NAND strings within the block 302, including the NAND string 310 the includes the memory cell 316. The voltage applied to the select lines 308 is greater than threshold voltages of the select transistors 312 and 314. The select transistor 312 is controlled by the select gate drain line (SGD) 308-1 and the select transistor 314 is controlled by the select gate source line (SGS) 308-2. Additionally, in order to read data in the memory cell 316, all other memory cells or unselected memory cells in the NAND string 319 are turned on (e.g., conducting current regardless of whether they are programmed or erased). The unselected memory cells have a read pass voltage—i.e., read parameters—applied to their respective word lines that turn on the unselected memory cells.

During the example read operation, various read compare levels—i.e., voltages—are applied to the word line 306-2 to determine the value stored in the memory cell 316. In some embodiments, the conduction current of the memory cell 316 is measured to determine the value stored within the memory cell 316. The method in which each memory cell is accessed and the number of memory cells accessed during a read or write varies. For example, all of the bit lines of the memory block 302-1 can be simultaneously programmed or read. In various embodiments, memory cells along a shared word line can be programmed at the same time (i.e., concurrently). In other embodiments, the bit lines can be divided into even bit lines and odd bit lines. In an odd/even bit line architecture, memory cells along a shared word line and connected to the odd bit lines are programmed at one time, while memory cells along a shared word line and connected to an even bit line are programmed at a different time.

Each time data is written to a memory block the data is processed by the ECC engine 212 which includes encoding the data (e.g., using a particular error correction code) and storing the encoded data in the memory block. When the data is read back out of the memory block, the data is processed by the ECC engine 212 which includes decoding the data, correcting errors (e.g., tracked as the BER), and returning the data to a user (by way of the controller 104). In some embodiments, the amount of time the ECC engine 212 takes to return data to the controller 104 is defined as the throughput time.

In some embodiments, the memory blocks 302-1 to 302-N may be grouped into partitions, such as a boot partition, a replay protected memory block (RPMB) partition, a user partition, an operating system partition, or other suitable partition. In some embodiments, the partitions, as described, may include groups of portions of the memory blocks 302-1 to 302-N (e.g., the partitions may include groups that do not comprise entire memory blocks). The controller 104 is configured to dynamically set access characteristics of a partition or of a portion of a partition defined by an address range (e.g., a range of memory locations within the partition). The access characteristics may include a standard read characteristic, a standard write characteristic, an RPMB read characteristic, an RPMB write characteristic, other suitable access characteristics, or a combination thereof.

In some embodiments, the controller 104 receives an address range and a set command from an entity attempting to set the access characteristics of a portion of a partition of the storage system 102 corresponding to the address range. The address range may correspond to a subset of the memory blocks 302-1 to 302-N of the partition or the entire partition. Additionally, or alternatively, the entity may communicate, to the controller 104, multiple address ranges, corresponding to multiple partitions of the storage system 102, and multiple set commands, corresponding to each of the multiple address ranges.

The entity attempting to set the access characteristics of the address range of the partition may include a System on a Chip (SoC), a controller, a remote server, or other suitable entity. In some embodiments, the entity includes the host 106. As will be described, the controller 104 may authenticate the entity (e.g., the host 106) before setting the access characteristics of the memory blocks associated with the address range.

The set command may include instructions to set the access characteristics of the memory blocks (e.g., associated ones of the memory blocks 302-1 to 302-N) associated with the address range to a protected state of a plurality of protected states. The protected state indicates the entity's instructed future state of the memory blocks of the address range. In some embodiments, the protected state includes a standard read characteristic and a standard write characteristic. In some embodiments, the protected state includes the standard read characteristics, the standard write characteristic, an RPMB read characteristic, and an RPMB write characteristic for the memory blocks associated with the address range.

In some embodiments, the plurality of protected states may include four protected states. For example, the plurality of protected states may include a first protected state, a second protected state, a third protected state, and a fourth protected state. It should be understood that while only four protected states are described herein, the plurality of protected states may include any suitable number of protected states and may include protected states that are different than those described herein.

FIG. 4A generally illustrates a protected state diagram 400 according to the principles of the present disclosure. The protected state diagram 400 includes a state number column 402, a standard read column 404, a standard write column 406, an RPMB read column 408, and an RPMB write column 410. The state number column 402 represents the state number of the protected state.

The standard read column 404 represents a standard read characteristic of the protected state. The standard read characteristic may include an open access standard read characteristic or a closed access standard read characteristic. The open access standard read characteristic indicates that any entity can perform standard read operations on data stored in a memory block having an open access standard read characteristic and the closed access standard read characteristic indicates that no entity can perform standard read operations on data stored in a memory block having a closed access standard read characteristic. While any entity can perform standard read operations on data stored in a memory block having an open access standard read characteristic, only an authenticated entity, as will be described, can set the access characteristics of a memory block (e.g., memory blocks associated with the address range).

The standard write column 406 represents a standard write characteristic of the protected state. The standard write characteristic may include an open access standard write characteristic or a closed access standard write characteristic. The open access standard write characteristic indicates that any entity can perform standard write operations on a memory block having an open access standard write characteristic and the closed access standard write characteristic indicates that no entity can perform standard write operations on a memory block having a closed access standard write characteristic. While any entity perform standard write operations on a memory block having an open access standard write characteristic, only an authenticated entity, as will be described, can set the access characteristics of a memory block (e.g., memory blocks associated with the address range).

The RPMB read column 408 represents an RPMB read characteristic of the protected state. The RPMB read characteristic may include a closed access RPMB read characteristic or an authenticated access RPMB read characteristic. The closed access RPMB read characteristic indicates that no entity can perform RPMB read operations on data stored in a memory block having a closed access RPMB read characteristic (e.g., neither authenticated or unauthenticated entities can read data stored in a memory block having a closed access RPMB read characteristic). The authenticated access RPMB read characteristic indicates that all entities can perform RPMB read operations on data stored in a memory block having an authenticated access RPMB read characteristic and only authenticated entities can verify the data stored in a memory block having an authenticated access RPMB read characteristic.

The RPMB write column 410 represent an RPMB write characteristic of the protected state. The RPMB write characteristic may include a closed access RPMB write characteristic or an authenticated access RPMB write characteristic. The closed access RPMB write characteristic indicates that no entity can perform RPMB write operations on a memory block having a closed access RPMB write characteristic (e.g., neither authenticated or unauthenticated entities can write data to a memory block having a closed access RPMB write characteristic). The authenticated access RPMB write characteristic indicates that only authenticated entities, as will be described, can perform RPMB write operations on a memory block having an authenticated access RPMB write characteristic.

As described, the plurality of protected states may include the first protected state, the second protected state, the third protected state, and the fourth protected state, as illustrated in the diagram 400. The first state (e.g., state number 1) includes an open access standard read characteristic (e.g. indicated in the standard read column 404), an open access standard write characteristic (e.g., indicated in the standard write column 406), a closed access RPMB read characteristic (e.g., indicated in the RPMB read column 408), and a closed access RPMB write characteristic (e.g., indicated in the RPMB write column 410). Accordingly, any entity can perform standard read operations and standard write operations on memory blocks (e.g., of the address range) set to the first protected state. Additionally, or alternatively, no entity can perform RPMB read operations and RPMB write operations on memory blocks (e.g., of the address range) set to the first protected state.

The second state (e.g., state number 2) includes an open access standard read characteristic (e.g. indicated in the standard read column 404), a closed access standard write characteristic (e.g., indicated in the standard write column 406), a closed access RPMB read characteristic (e.g., indicated in the RPMB read column 408), and a closed access RPMB write characteristic (e.g., indicated in the RPMB write column 410). Accordingly, any entity can perform standard read operations on memory blocks (e.g., of the address range) set to the second state. Additionally, or alternatively, no entity can perform standard write operations on memory blocks (e.g., of the address range) set to the second protected state. Additionally, or alternatively, no entity can perform RPMB read operations and RPMB write operations on memory blocks (e.g., of the address range) set to the second protected state.

The third state (e.g., state number 3) includes a closed access standard read characteristic (e.g. indicated in the standard read column 404), a closed access standard write characteristic (e.g., indicated in the standard write column 406), an authenticated access RPMB read characteristic (e.g., indicated in the RPMB read column 408), and an authenticated access RPMB write characteristic (e.g., indicated in the RPMB write column 410). Accordingly, no entity can perform standard read operations and standard write operations on memory blocks (e.g., of the address range) set to the third protected state. Additionally, or alternatively, only an authenticated entity, as will be described, can perform RPMB read operations and RPMB write operations on memory blocks (e.g., of the address range) set to the third protected state.

The fourth state (e.g., state number 4 includes an open access standard read characteristic (e.g. indicated in the standard read column 404), a closed access standard write characteristic (e.g., indicated in the standard write column 406), an authenticated access RPMB read characteristic (e.g., indicated in the RPMB read column 408), and an authenticated access RPMB write characteristic (e.g., indicated in the RPMB write column 410). Accordingly, any entity can perform standard read operations on memory blocks (e.g., of the address range) set to the fourth state. Additionally, or alternatively, no entity can perform standard write operations on memory blocks (e.g., of the address range) set to the fourth protected state. Additionally, or alternatively, only an authenticated entity, as will be described, can perform RPMB read operations and RPMB write operations on memory blocks (e.g., of the address range) set to the fourth protected state.

Figure 4B:

FIG. 4B generally illustrates a protected state diagram 400' according to the principles of the present disclosure. The protected state diagram 400' includes a state number column 402', a standard read column 404', a standard write column 406'. The standard read column 404' represents a standard read characteristic of the protected state. The standard read characteristic may include an open access standard read characteristic or a closed access standard read characteristic. The open access standard read characteristic indicates that any entity can perform standard read operations on data stored in a memory block having an open access standard read characteristic and the closed access standard read characteristic indicates that no entity can perform standard read operations on data stored in a memory block having a closed access standard read characteristic. While any entity can perform standard read operations on data stored in a memory block having an open access standard read characteristic, only an authenticated entity, as will be described, can set the access characteristics of a memory block (e.g., memory blocks associated with the address range).

The standard write column 406' represents a standard write characteristic of the protected state. The standard write characteristic may include an open access standard write characteristic or a closed access standard write characteristic. The open access standard write characteristic indicates that any entity can perform standard write operations on a memory block having an open access standard write characteristic and the closed access standard write characteristic indicates that no entity can perform standard write operations on a memory block having a closed access standard write characteristic. While any entity perform standard write operations on a memory block having an open access standard write characteristic, only an authenticated entity, as will be described, can set the access characteristics of a memory block (e.g., memory blocks associated with the address range).

The plurality of protected states illustrated in FIG. 4B may include the first alternative protected state, the second alternative protected state, and the third alternative protected state, as illustrated in the diagram 400'. The first alternative protected state (e.g., state number 1') includes an open access standard read characteristic (e.g. indicated in the standard read column 404') and an open access standard write characteristic (e.g., indicated in the standard write column 406'. Accordingly, any entity can perform standard read operations and standard write operations on memory blocks (e.g., of the address range) set to the first alternative protected state.

The second alternative protected state (e.g., state number 2') includes an open access standard read characteristic (e.g. indicated in the standard read column 404') and a closed access standard write characteristic (e.g., indicated in the standard write column 406'. Accordingly, any entity can perform standard read operations on memory blocks (e.g., of the address range) set to the second alternative protected state.

The third alternative protected state (e.g., state number 3') includes a closed access standard read characteristic (e.g. indicated in the standard read column 404') and a closed access standard write characteristic (e.g., indicated in the standard write column 406'. Accordingly, no entity can perform standard read operations and standard write operations on memory blocks (e.g., of the address range) set to the third alternative protected state.

In some embodiments, the controller 104 may set the access characteristics, based on an authentication of the entity, of the memory blocks associated with the address range to the protected state indicated in the set command. For example, as described, the controller 104 may receive an address range and a set command from the host 106. The address range may correspond to a subset of the memory blocks 302-1 to 302-N of the partition or the entire partition. The set command may include instructions to set the memory blocks corresponding to the address range to a protected state (e.g., set the access characteristics of the memory blocks to access characteristics represented by the protected state) indicated by the set command.

As described, only authorized entities can set access characteristics of the memory blocks corresponding to the address range (e.g., cause the controller 104 to set the access characteristics to the memory blocks according to the protected state). The controller 104 determines whether the host 106 (e.g., the entity attempting to set access characteristics of the memory blocks associated with the address range) is an authorized entity. Authentication of the host 106 is controlled using an encryption scheme. For example, authentication of the host 106 may be controlled using a symmetric key scheme. A symmetric key scheme uses cryptographic keys that reside on a potentially authorized entity and the authenticating entity. In some embodiments, the cryptographic keys may be identical or there may be a transformation to go between the cryptographic keys (e.g., a transformation between plaintext and ciphertext for each cryptographic key).

The controller 104 determines whether a cryptographic key residing on the host 106 (e.g., the entity attempting to read from and/or write to the RPMB partition) corresponds to a cryptographic key residing on the storage system 102 (e.g., associated with the RPMB partition). In some embodiments, the controller 104 may request a cryptographic key from the host 106. In some embodiments, the host 106 may include the cryptographic key with the address range and set command communicated to the controller 104, as described. In some embodiments, the host 106 performs a cryptographic signature corresponding to the cryptographic key. If the controller 104 determines that the cryptographic key residing on the host 106 corresponds to the cryptographic key residing on the storage system 102, the controller 104 determines the host 106 is an authorized entity. Conversely, if the controller determines that the cryptographic key residing on the host 106 does not correspond to cryptographic key residing on the storage system 102 or if no cryptographic key resides on the host 106, the controller 104 determines the host 106 is not an authorized entity.

If the controller 104 determines the host 106 is not an authorized entity, the controller 104 denies access to the access characteristics of memory blocks associated with the address range (e.g., the controller 104 does not allow the host 106 to set the access characteristics of the memory blocks or the controller 104 does not set the access characteristics of the memory blocks in response to the set command received from the host 106).

Conversely, if the controller 104 determines the host 106 is an authorized entity, the controller 104 sets the access characteristics of the memory blocks associated with the address range according to the protected state indicated by the set command.

In some embodiments, the host 106 may dynamically set (e.g., cause the controller 104 to set) the access characteristics of the memory blocks associated with the address range. For example, the host 106 may provide, to the controller 104, the address range and a set command that indicates setting the memory blocks associated with the address range to one of the protected states of the plurality of protected states. The controller 104 determines whether the host 106 is an authorized entity. If the controller 104 determines the host 106 is an authorized entity, the controller 104 sets the memory blocks associated with the address range according to the protected state indicated by the set command. The host 106 may provide, to the controller 104, the address range and a different set command that indicates setting the memory blocks associated with the address range to a different protected state of the protected states. For example, the type of use of the memory blocks associated with the address range may change, which may prompt the host 106 to change the protected state of the memory blocks associated with the address range. The controller 104 may, based on the determination that the host 106 is an authorized entity, set the memory blocks associated with the address range to the different protected state. The host 106 may continue to dynamically set (e.g., cause the controller 104 to set) the access characteristics of the memory blocks associated with the address range.

In some embodiments, the host 106 may be an original equipment manufacturer (OEM) that loads data associated within an operating system (OS) to the memory blocks associated with the address range. As described, the address range can be associated with any partition of the storage system 102. For example, the address range may correspond to an OS designated portion of a user partition on the storage system 102. While the storage system 102 is in a secure environment (e.g., such as a pre-production environment or a manufacturer controlled environment), the memory blocks associated with the address range may be set to the first protected state, such that, while the host 106 is loading the OS to the memory blocks associated with the address range, the host 106, and any other entity, can perform standard read and standard write operations on the memory blocks associated with the address range.

When the storage system 102 is no longer in the secure environment (e.g., such as a user environment or a customer environment), the host 106 may provide to the controller 104 the address range and a set command that indicates setting the memory blocks associated with the address range to the fourth protected state. The controller 104 determines whether the host 106 is an authorized entity, as described. If the controller 104 determines the host 106 is an authorized entity, the controller 104 sets the memory blocks associated with the address range to the fourth protected state, such that, any entity can continue to perform standard read operations on the memory blocks associated with the address range (e.g., so that the OS can be read) and only an authorized entity can perform RPMB read and RPMB write operations on the memory blocks associated with the address range. For example, the host 106 may perform standard read operations, RPMB read operations, and RPMB write operations on the memory blocks of the address range to update the OS, while unauthorized entities are restricted from performing RPMB write operations, while still being able to perform standard read operations. In some embodiments, the host 106 may use an RPMB application program interface (API) that allows the host 106 to perform RPMB read and RPMB write operations on partitions (e.g., partitions not typically designated as RPMB partitions) having an RPMB read access characteristic and/or an RPMB write access characteristic set to authenticated access.

As described above, by setting any partition (e.g., address range of memory blocks) of the storage system 102 to one of the protected states, such as the fourth state, the partition may include the access characteristics of an RPMB partition without having the size limitations of an RPMB partition. Additionally, or alternatively, the partition may be set to allow, as described, any entity to perform standard read operations on the partition while restricting RPMB read operations and RPMB write operations to authorized entities only, which may provide for a high read performance of the partition. Additionally, or alternatively, setting the partition to one state, such as the first protected state, while the storage system 102 is in the secure environment, and setting the partition to another state, such as the fourth state, when the storage system 102 is no longer in the secure environment may provide a high write performance of the partition (e.g., by allowing standard write operations to be performed while the storage system 102 is in the secure environment).

Figure 5:
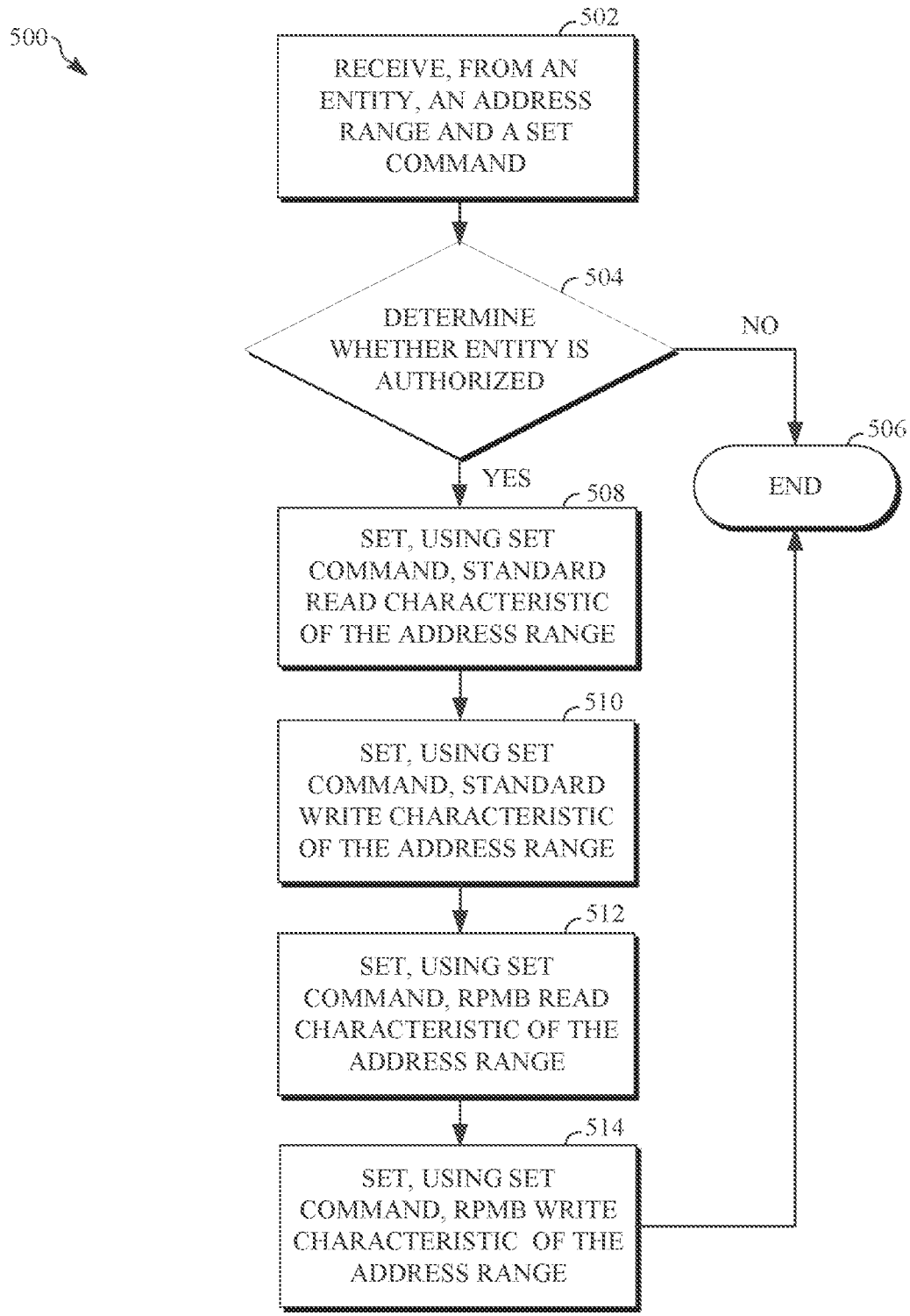
FIG. 5 is a flow diagram illustrating a replay protected memory block characteristics setting method according to the principles of the present disclosure.

FIG. 5 is a flow diagram illustrating a replay protected memory block characteristics setting method 500 according to the principles of the present disclosure. In some embodiments, the controller 104 may perform the methods described herein. However, the methods described herein as performed by the controller 104 are not meant to be limiting, and any type of software executed on a controller can perform the methods described herein without departing from the scope of this disclosure. For example, a controller such as a processor executing software within the host 106 or firmware within the storage system 102 (e.g., stored on ROM 232 or NVM memory block 110) can perform the methods described herein.

At 502, the method 500 receives, from an entity, an address range and a set command. As described, the controller 104 may receive an address range and a set command from, for example, the host 106. At 504, the method 500 determines whether the entity is authorized. As described, the controller 104 may determine whether the host 106 is an authorized entity by using a cryptographic key residing on the storage system 102 to verify a cryptographic signature being performed by the host 106. If the controller 104 determines that the host 106 is not an authorized entity, the method ends at 506. If the controller 104 determines that the host 106 is an authorized entity, the method continues at 508. At 508, the method 500 sets, using the set command, a standard read characteristic associated with the address range. As described, the controller 104 sets the standard read characteristic of the memory blocks associated with the address range to the standard read characteristic indicated by the protected state indicated by the set command. At 510, the method 500 sets, using the set command, a standard write characteristic associated with the address range. As described, the controller 104 sets the standard write characteristic of the memory blocks associated with the address range to the standard write characteristic indicated by the protected state indicated by the set command. At 512, the method 500 sets, using the set command, an RPMB read characteristic associated with the address range. As described, the controller 104 sets the RPMB read characteristic of the memory blocks associated with the address range to the RPMB read characteristic indicated by the protected state indicated by the set command. At 514, the method 500 sets, using the set command, an RPMB write characteristic associated with the address range. As described, the controller 104 sets the RPMB write characteristic of the memory blocks associated with the address range to the RPMB write characteristic indicated by the protected state indicated by the set command. While steps 508-512 of the method 500 are described as being sequential steps, the method 500, using the controller 104, may set the standard read characteristic, the standard write characteristic, the RPMB read characteristic, and the RPMB write characteristic, for the address range, in one step (e.g., simultaneously, or substantially simultaneously) using the set command. The method 500 ends at 506.

In some embodiments, a method for data protection in a memory system includes receiving, from an entity, an address range and a set command, the address range corresponding to at least a portion of a memory partition in the memory system. The method further includes determining whether the entity is an authenticated entity. The method further includes based on the determination of whether the entity is an authenticated entity, setting, using the set command, at least a replay protected memory block (RPMB) read characteristic of the portion of the partition corresponding to the address range and an RPMB write characteristic of the portion of the partition corresponding to the address range.

In some embodiments, the method further includes, based on the determination of whether the entity is an authenticated entity, setting, using the set command, a standard read characteristic of the portion of the partition corresponding to the address range. In some embodiments, the method further includes, based on the determination of whether the entity is an authenticated entity, setting, using the set command, a standard write characteristic of the portion of the partition corresponding to the address range. In some embodiments, the set command includes a command to set the portion of the partition corresponding to the address range to a protected state of a plurality of dynamically selectable protected states. In some embodiments, the protected state indicated by the set command includes an open access standard read state, an open access standard write state, a closed access RPMB read state, and a closed access RPMB write state. In some embodiments, the protected state indicated by the set command includes an open access standard read state, a closed access standard write state, a closed access RPMB read state, and a closed access RPMB write state. In some embodiments, the protected state indicated by the set command includes a closed access standard read state, a closed access standard write state, an authenticated entities access RPMB read state, and an authenticated entities access RPMB write state. In some embodiments, the protected state indicated by the set command includes an open access standard read state, a closed access standard write state, an authenticated entities access RPMB read state, and an authenticated entities access RPMB write state.

In some embodiments, a memory system includes a non-volatile storage having memory partitions and a controller in communication with the memory partitions. The controller is configured to: receive, from an entity, an address range and a set command, the address range corresponding to at least a portion of a memory partition in the memory system; determine whether the entity is an authenticated entity; and based on the determination of whether the entity is an authenticated entity, set, using the set command, at least: a replay protected memory block (RPMB) read characteristic of the portion of the partition corresponding to the address range; and an RPMB write characteristic of the portion of the partition corresponding to the address range.

In some embodiments, the controller is further configured to, based on the determination of whether the entity is an authenticated entity, set, using the set command, a standard read characteristic of the portion of the partition corresponding to the address range. In some embodiments, the controller is further configured to, based on the determination of whether the entity is an authenticated entity, set, using the set command, a standard write characteristic of the portion of the partition corresponding to the address range. In some embodiments, the set command includes a command to set the portion of the partition corresponding to the address range to a protected state of a plurality of dynamically selectable protected states. In some embodiments, the protected state indicated by the set command includes an open access standard read state, an open access standard write state, a closed access RPMB read state, and a closed access RPMB write state. In some embodiments, the protected state indicated by the set command includes an open access standard read state, a closed access standard write state, a closed access RPMB read state, and a closed access RPMB write state. In some embodiments, the protected state indicated by the set command includes a closed access standard read state, a closed access standard write state, an authenticated entities access RPMB read state, and an authenticated entities access RPMB write state. In some embodiments, the protected state indicated by the set command includes an open access standard read state, a closed access standard write state, an authenticated entities access RPMB read state, and an authenticated entities access RPMB write state.

In some embodiments, a method for operating a memory system having a controller and memory partitions includes receiving, from an entity, an address range and a set command, wherein the address range corresponds to at least a portion of a memory partition in the memory system and wherein the set command includes a command to set the portion of the partition corresponding to the address range to a protected state of a plurality of dynamically selectable protected states. The method further includes determining whether the entity is an authenticated entity. The method further includes based on the determination of whether the entity is an authenticated entity, setting, using the set command, at least: a replay protected memory block (RPMB) read characteristic of the portion of the partition corresponding to the address range; and an RPMB write characteristic of the portion of the partition corresponding to the address range.

In some embodiments, the protected state indicated by the set command includes an open access standard read state, a closed access standard write state, a closed access RPMB read state, and a closed access RPMB write state. In some embodiments, the protected state indicated by the set command includes a closed access standard read state, a closed access standard write state, an authenticated entities access RPMB read state, and an authenticated entities access RPMB write state. In some embodiments, the protected state indicated by the set command includes an open access standard read state, a closed access standard write state, an authenticated entities access RPMB read state, and an authenticated entities access RPMB write state.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

Various terms are used to refer to particular system components. In the above discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Controller" shall mean individual circuit components, an application-specific integrated circuit (ASIC), a microcontroller with controlling software, a digital signal processor (DSP), a processor with controlling software, a field programmable gate array (FPGA), or combinations thereof.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein , the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module. In some embodiments, the controller 104 is implemented within the host 106 can be configured with hardware and/or firmware to perform the various functions described herein.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for data protection in a memory system, the method comprising:
   receiving, from an entity, an address range and a set command, the address range corresponding to at least a portion of a memory partition in the memory system;
   determining whether the entity is an authenticated entity; and
   based on the determination of whether the entity is authenticated entity, setting, using the set command, at least:
      a replay protected memory block (RPMB) read characteristic of the portion of the partition corresponding to the address range; and
      an RPMB write characteristic of the portion of the partition corresponding to the address range.

2. The method of claim 1, further comprising, based on the determination of whether the entity is an authenticated entity, setting, using the set command, a standard read characteristic of the portion of the partition corresponding to the address range.

3. The method of claim 1, further comprising, based on the determination of whether the entity is an authenticated entity, setting, using the set command, a standard write characteristic of the portion of the partition corresponding to the address range.

4. The method of claim 1, wherein the set command includes a command to set the portion of the partition corresponding to the address range to a protected state of a plurality of dynamically selectable protected states.

5. The method of claim 4, wherein the protected state indicated by the set command includes an open access standard read state, an open access standard write state, a closed access RPMB read state, and a closed access RPMB write state.

6. The method of claim 4, wherein the protected state indicated by the set command includes an open access standard read state, a closed access standard write state, a closed access RPMB read state, and a closed access RPMB write state.

7. The method of claim 4, wherein the protected state indicated by the set command includes a closed access standard read state, a closed access standard write state, an authenticated entities access RPMB read state, and an authenticated entities access RPMB write state.

8. The method of claim 4, wherein the protected state indicated by the set command includes an open access standard read state, a closed access standard write state, an authenticated entities access RPMB read state, and an authenticated entities access RPMB write state.

9. A controller comprising:
   a bus interface configured to receive, from an entity, an address range and a set command, the address range corresponding to at least a portion of a memory partition in a non-volatile memory system;
   a processor configured to
      determine whether the entity is an authenticated entity; and
      based on the determination of whether the entity is an authenticated entity, set, using the set command, at least:
         a replay protected memory block (RPMB) read characteristic of the portion of the partition corresponding to the address range; and
         an RPMB write characteristic of the portion of the partition corresponding to the address range.

10. The controller of claim 9, wherein the processor is further configured to, based on the determination of whether the entity is an authenticated entity, set, using the set command, a standard read characteristic of the portion of the partition corresponding to the address range.

11. The controller of claim 9, wherein the processor is further configured to, based on the determination of whether the entity is authenticated entity, set, using the set command, a standard write characteristic of the portion of the partition corresponding to the address range.

12. The controller of claim 9, wherein the set command includes a command to set the portion of the partition corresponding to the address range to a protected state of a plurality of dynamically selectable protected states.

13. The controller of claim 12, wherein the protected state indicated by the set command includes an open access standard read state, an open access standard write state, a closed access RPMB read state, and a closed access RPMB write state.

14. The controller of claim 12, wherein the protected state indicated by the set command includes an open access standard read state, a closed access standard write state, a closed access RPMB read state, and a closed access RPMB write state.

15. The controller of claim 12, wherein the protected state indicated by the set command includes a closed access standard read state, a closed access standard write state, an authenticated entities access RPMB read state, and an authenticated entities access RPMB write state.

16. The controller of claim 12, wherein the protected state indicated by the set command includes an open access standard read state, a closed access standard write state, an authenticated entities access RPMB read state, and an authenticated entities access RPMB write state.

17. A method for operating a memory system having a controller and memory partitions, the method comprising:

receiving, from an entity, an address range and a set command, wherein the address range corresponds to at least a portion of a memory partition in the memory system and wherein the set command includes a command to set the portion of the partition corresponding to the address range to a protected state of a plurality of dynamically selectable protected states;

determining whether the entity is an authenticated entity; and based on the determination of whether the entity is an authenticated entity, setting, using the set command, at least:

a read characteristic of the portion of the partition corresponding to the address range; and a write characteristic of the portion of the partition corresponding to the address range.

18. The method of claim 17, wherein the protected state indicated by the set command includes an open access standard read state and a closed access standard write state.

19. The method of claim 17, wherein the protected state indicated by the set command includes a closed access standard read state and a closed access standard write state.

20. The method of claim 17, wherein the protected state indicated by the set command includes an open access standard read state and closed access standard write state.

* * * * *